United States Patent [19]

Foughty

[11] Patent Number: 4,475,872

[45] Date of Patent: Oct. 9, 1984

[54] WATER PUMP AND GEAR BOX THEREFOR

[75] Inventor: Joan S. Foughty, Urbana, Ohio

[73] Assignee: Robbins & Myers, Inc., Dayton, Ohio

[21] Appl. No.: 425,154

[22] Filed: Sep. 28, 1982

[51] Int. Cl.$^3$ .............................................. F04B 19/00
[52] U.S. Cl. ..................................... 417/315; 74/812;
    166/68.5; 417/319; 417/335; 417/336; 417/374;
    417/326
[58] Field of Search ............... 417/315, 316, 319, 326,
    417/374, 223, 336, 335, 424, 15; 166/68.5;
    74/812

[56] References Cited

U.S. PATENT DOCUMENTS

| Re. 30,423 | 10/1980 | Hutton et al. |
|---|---|---|
| 1,197,013 | 9/1916 | Cummings . |
| 1,329,137 | 1/1920 | Oldham .............................. 417/374 |
| 1,466,979 | 9/1923 | Whittington . |
| 1,490,796 | 4/1924 | Blomberg . |
| 1,516,734 | 11/1924 | Johnson . |
| 2,043,077 | 6/1936 | Stewart . |
| 2,104,387 | 1/1938 | Hull et al. ....................... 417/374 X |
| 2,267,459 | 12/1941 | Hait ..................................... 417/424 |
| 2,505,841 | 5/1950 | Shuker et al. . |
| 3,666,063 | 5/1972 | Schoeman et al. . |
| 3,832,914 | 9/1974 | Pinfield . |
| 4,137,798 | 2/1979 | Sisk et al. . |

FOREIGN PATENT DOCUMENTS 44173  1/1917  Sweden ............................ 417/335

Primary Examiner—Edward K. Look
Attorney, Agent, or Firm—Biebel, French & Nauman

[57] ABSTRACT

A water pump includes a pump stand and a spout mounted on the stand for communication with its interior. A rotary drive shaft supported by the pump stand extends downwardly to an underground water supply. A pump rotor supported by the drive shaft is positioned within a stator communicating with the water supply, for cooperating to pump water to the pump stand and the spout. An input shaft applies a rotary driving motion to a gear box mounted on the pump stand, which in turn applies a rotary driving motion to the drive shaft. The gear box includes first and second bevel gears mounted on the input shaft in a spaced apart relation. A first clutch permits relative rotary motion in a first direction between the input shaft and the first gear while prohibiting relative rotary motion in a second direction. A second clutch permits relative rotary motion between the input shaft and the second bevel gear in the second direction, while prohibiting relative rotary motion in the first direction. A third bevel gear, mounted fast on the drive shaft for driving contact with the first and second bevel gears, is rotated in a common direction by rotation of the input shaft in either the first or second direction.

7 Claims, 7 Drawing Figures

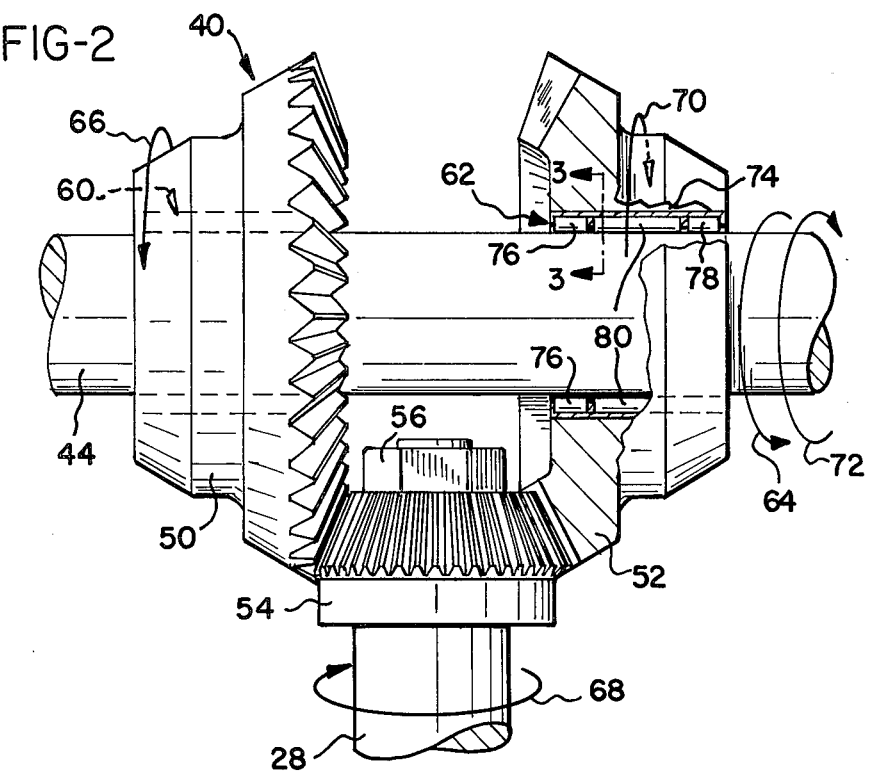
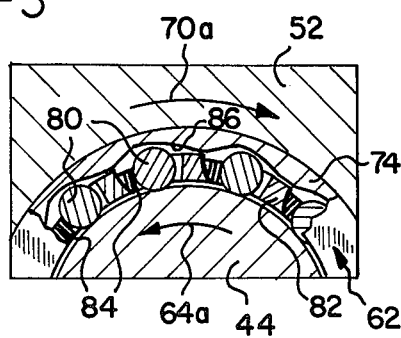
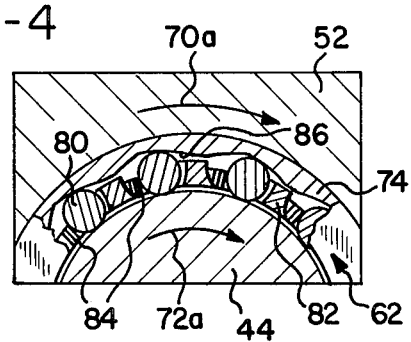

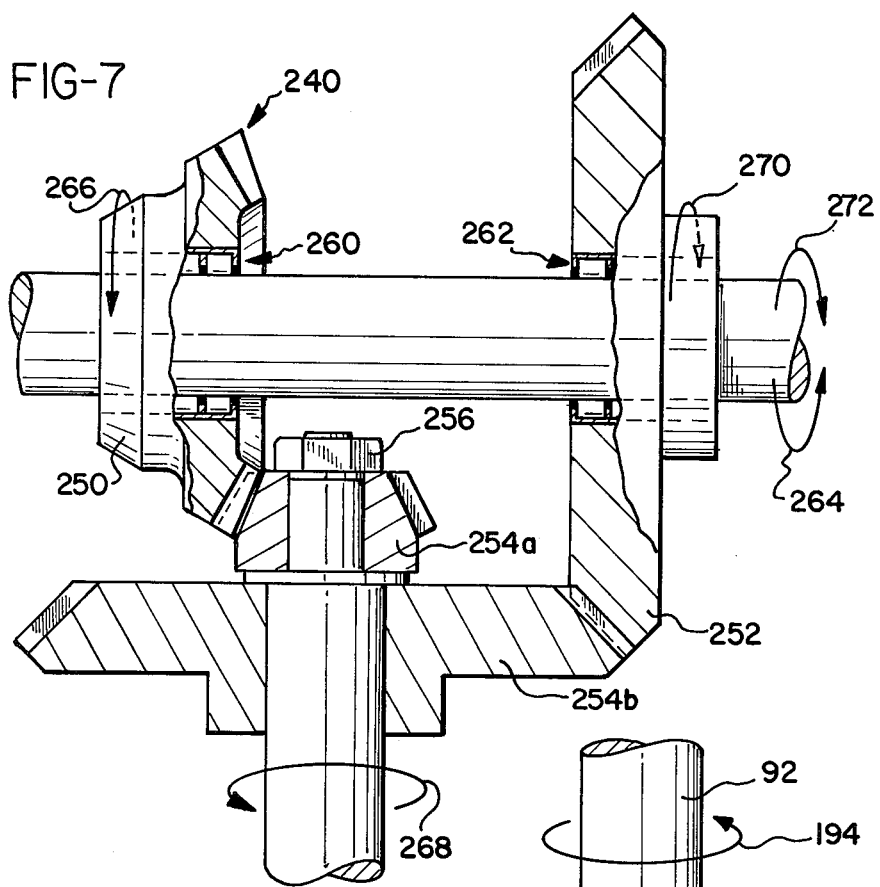
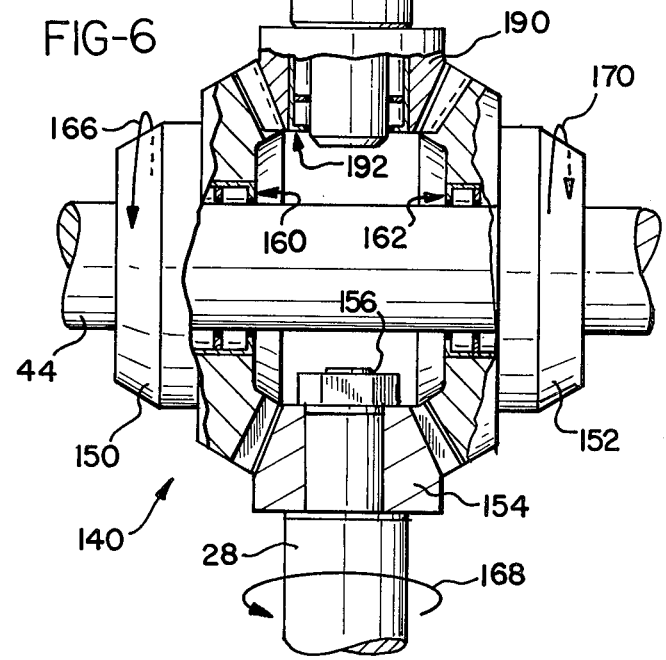

WATER PUMP AND GEAR BOX THEREFOR

BACKGROUND OF THE INVENTION

The present invention relates to a gear box for use in conjunction with a water pump and, more particularly, to such a gear box that is operative in response to rotation of an input shaft such as, for instance, by a crank-type handle.

Various types of hand pumps are known for pumping water from an underground supply in addition to the traditional, reciprocating "farmyard" pump. Among these is the progressing cavity pump, wherein a screw-like helical rotor turns eccentrically within a helical stator. The stator is constructed of a resilient material, so that as the rotor is turned, a plurality of sealed cavities progress upwardly through the stator, carrying water within each cavity. This type of pump is generally more rugged and reliable than the reciprocating pump, since it has fewer moving parts, and thus is often preferred in remote pump installations.

Power is applied to such a pump from above ground by rotating a vertical drive shaft extending into the well and connected to the pump rotor. In installations where hand operation is desired, the shaft may be rotated by a pair of rotating handles attached to a horizontal input shaft. Power is transferred through a right angle gear box to the vertical shaft.

Care must be taken, however, to prevent the handles from being rotated in the wrong direction. In such a case, threaded connections in the horizontal or vertical shafts can become disconnected, rendering the pump inoperative. Additionally, in deep wells it is possible for the head of water in the pump to cause the pump rotor to motor when the handles are released. Thus, the handles could rotate when released. Consequently, hand pump designs of this type usually include a backstop device to permit the horizontal shaft carrying the handles to be rotated in only one direction.

Various backstop devices have been used. A simple lever may be provided for engaging a step in a cam affixed to the handle shaft whenever the handles are rotated in the wrong direction. More sophisticated devices, such as roller or ball bearing clutches, have also been used. In each case, however, the maximum torque or load the backstop could be subjected to is limited. Thus, it is possible to damage the backstop to the extent that the backstop fails to operate, which can ultimately result in failure to the pump.

In remote, underdeveloped areas, where the consequences of pump failure may be most severe, the pump user is often not technically sophisticated enough to appreciate the risk associated with incorrect rotation of the handles. Moreover, the backstop device may not be readily understood by the user, resulting in undue force being exerted thereupon, often leading to failure of the device.

What is needed, therefore, is a gear box for use in conjunction with a water pump that will prevent pump failure caused by operation of pump elements in the reverse direction by allowing the pump handles to be rotated in either direction. Such a gear box would eliminate the need for backstop devices to prevent rotation of the pump handles in the wrong direction.

SUMMARY OF THE INVENTION

The present invention provides a water pump that avoids the problems described above in that it permits rotation of the input shaft in either direction to obtain water from the pump. The pump includes a pump stand, a spout mounted on the pump stand for communication with its interior, and a pipe communicating with the interior of the pump stand and extending downwardly toward an underground water supply. A rotary drive shaft is supported by the pump stand and extends downwardly within the pipe. A stator means is supported by the pipe and communicates with the water supply, and a pump rotor is supported by the drive shaft and positioned within the stator means for cooperating therewith to pump water up the pipe to the pump stand and the spout. A gear box is supported on the pump stand for applying a rotary driving motion to the drive shaft. An input shaft is provided for applying a rotary driving motion to the gear box, by way of a means for rotation of the input shaft.

The water pump is characterized in that the gear box includes first and second bevel gears mounted on the input shaft in a spaced apart relation. A first clutch permits relative rotary motion in a first direction between the input shaft and the first bevel gear while prohibiting relative rotary motion in a second direction opposite the first direction. In similar fashion, a second clutch permits relative rotary motion between the input shaft and the second bevel gear in the second direction, while prohibiting relative rotary motion therebetween in the first direction. A third bevel gear, mounted fast on the drive shaft for driving contact with the first and second bevel gears, is rotated in a common direction by rotation of the input shaft in either the first or second directions. The third bevel gear, however, is locked against rotation resulting from rotary forces upon the drive shaft in a direction opposite the common direction.

The means for rotation of the input shaft may include a handle mounted fast on the shaft. Alternatively, the rotation means may include a motor operatively connected with the input shaft such that energization of the motor causes rotation of the input shaft. As a third alternative, the drive shaft may be rotated by a wind-driven turbine, the turbine being operatively connected to the drive shaft through the gear box.

The first and second bevel gears within the gear box may be of differing diameters. In such a case, the third bevel gear mounted fast on the drive shaft is in driving contact with the first bevel gear, whereas a fourth bevel gear mounted fast on the drive shaft is in driving contact with the second bevel gear. Rotation of the input shaft in the first direction rotates the drive shaft at a first speed through the first and third bevel gears, and rotation of the input shaft in the second direction drives the drive shaft through the second and fourth bevel gears, at a second, differing rate of rotation.

Accordingly, it is an object of the present invention to provide a water pump of the progressing cavity type that is free from risk of failure due to rotation of the pump input shaft in the wrong direction; to provide a gear box for such a pump that rotates the pump drive shaft in a common direction regardless of the direction of rotation of the input shaft; to provide such a water pump and gear box that can be driven manually, by a electric motor, or by wind power; and to provide a water pump and gear box that enables operation of the pump at two differing rates, depending upon the direction of rotation of the input shaft.

BRIEF DESCRIPTION OF THE DRAWINGS

FIG. 2 is an elevational view of an embodiment of the gear box, showing a portion of one gear cut away;

FIG. 3 is a view taken generally along line 3—3 of FIG. 2, showing the bearing clutch disengaged;

FIG. 4 is a view taken generally along line 3—3 of FIG. 2, showing the bearing clutch engaged;

FIG. 6 is an elevational view of an embodiment of the gear box adapted for use with the pump as shown in FIG. 5, showing portions of the gears cut away; and FIG. 7 is an elevational view of a further embodiment of the gear box.

DETAILED DESCRIPTION OF THE PREFERRED EMBODIMENTS

Figure 1:
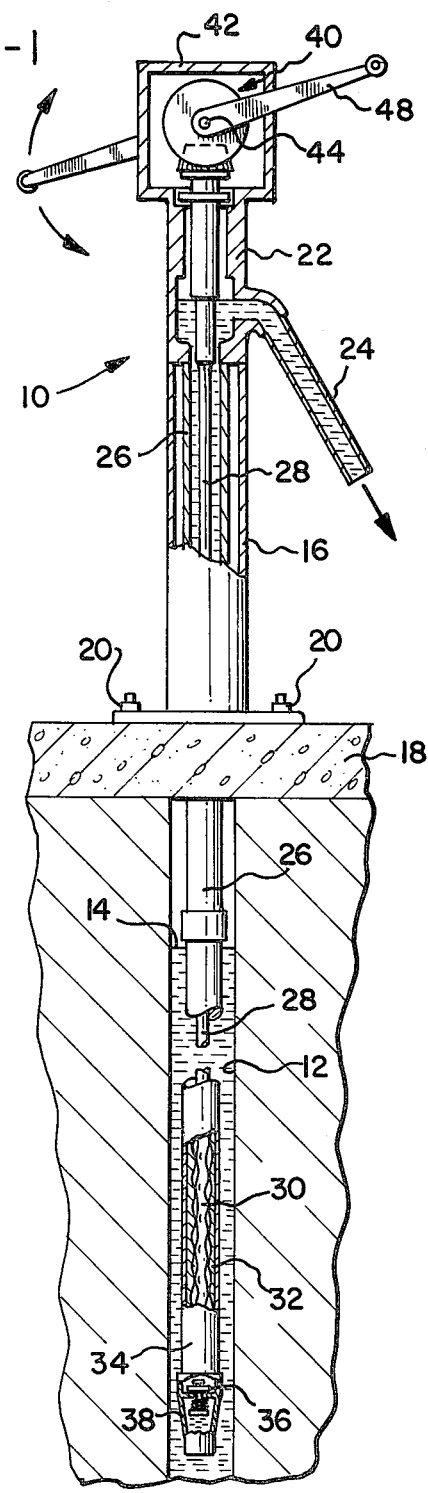
FIG. 1 is a sectional view of a water pump and gearbox of the present invention, showing an embodiment thereof adapted for hand operation.

Referring to FIG. 1, a water pump 10 is shown for use in drawing water from a well 12 having a water table 14. Pump 10 includes a pump stand 16 secured to a concrete slab 18 or the like by bolts or pins 20.

A discharge head 22, including a spout 24, is mounted to the top of pump stand 16. A drop pipe 26 attached to discharge head 22, extends downwardly through pump stand 16, slab 18, and into well 12. A rotary drive shaft 28 is rotatably supported within discharge head 22 and extends downwardly through drop pipe 26 into water table 14. Attached to the lower end of drive shaft 28 is a helical rotor 30. A double helical stator 32, constructed of a resilient material, is mounted within a housing 34, threadingly connected to the lower end of drop pipe 26. Rotor 30 is disposed within stator 32, and upon rotation of drive shaft 28, turns within stator 32, producing sealed cavities that progress upwardly within the stator 32, thereby moving water upwardly within drop pipe 26.

A check valve 36 is mounted at the bottom of stator housing 34, so as to permit water flow into and prevent water flow out of stator housing 34. Check valve 36 is spring activated, and is preferably constructed of brass. A strainer 38 is mounted below check valve 36, to prevent the drawing of large abrasive particles into pump 10.

Driving of shaft 28 for operating pump 10 is provided through gear box 40 mounted within gear box housing 42, connected to the top of discharge head 22. An input shaft 44 extends through housing 42 and, in one embodiment of the present invention, includes handles 46 and 48 attached to each end of shaft 44 outside housing 42. Either or both of handles 46 and 48 are used to rotate input shaft 44, with gear box 40 translating the rotary motion of shaft 44 to drive shaft 28, as will be explained below. Rotation of shaft 28 causes rotor 30, in cooperation with stator 32, to pump water upwardly through drop pipe 26 into discharge head 22, from which it is delivered through spout 24.

Gear box 40 is shown in detail in FIG. 2. A first bevel gear 50 and a second bevel gear 52 are mounted to input shaft 44 in a spaced apart relation. A third bevel gear 54 is mounted to the end of drive shaft 28, fixedly secured by nut 56. Gears 50 and 52 are located on input shaft 44 so that each engages gear 54 on opposite sides thereof.

Each of gears 50 and 52 is provided with a bearing clutch 60 and 62, respectively, mounted between gears 50 and 52 and input shaft 44. Each clutch 60 and 62 serves as a one-way drive clutch, so that rotation of input shaft 44 in one direction causes either clutch 60 or 62 to engage, resulting in driving of the associated gear 50 or 52 by the shaft 44. When shaft 44 is rotated in the opposite direction, the clutch 60 or 62 disengages, permitting shaft 44 to rotate freely within the associated gear 50 or 52.

Clutches 60 and 62 are mounted to input shaft 44 with opposite orientations, which enables rotation of shaft 44 in either direction to result in driving of drive shaft 28 in but a single, constant direction. As seen in FIG. 2, clutch 60 is mounted with such an orientation that rotation of input shaft 44 in the direction indicated by arrow 64 causes clutch 60 to engage, thereby driving gear 50 as indicated by arrow 66. Gear 50 in turn drives gear 54, rotating shaft 28 in the direction shown by arrow 68. Since gear 54 also engages gear 52, however, gear 52 is rotated in the direction indicated by arrow 70. Recalling that clutch 62 is mounted to shaft 44 with an orientation opposite to clutch 60, however, rotation of shaft 44 as shown by arrow 64 causes clutch 62 to be disengaged, and thus gear 52 rotates freely on shaft 44.

Similarly, when input shaft 44 is rotated in the opposite direction, indicated by arrow 72, clutch 62 is engaged and clutch 60 is disengaged. Thus, gear 52 is now driven, although it again rotates in the direction indicated by arrow 70. Thus, gear 54 and shaft 28 are again driven as indicated by arrow 68, and gear 50 is rotated as shown by arrow 66. Since shaft 44 is now rotated in the opposite direction, however, clutch 60 is disengaged and gear 50 rotates freely about shaft 44. Hence, it can be seen that rotation of shaft 44 in either direction causes drive shaft 28 to be rotated in a single, common direction.

Clutch bearing 62 includes a housing 74 for maintaining in position three annular rows of roller bearings. The two outer rows, each comprised of a plurality of bearings 76 and 78 serve as bearings to facilitate rotation of gear 52 and support its load on shaft 44 when freely rotating thereabout. The center row, however, comprised of a plurality of rollers 80, functions to provide for the engaging and disengaging of clutch 62.

The operation of clutch 62 is shown in detail in FIGS. 3 and 4. A retaining member 82 is mounted within clutch housing 74, held stationary with respect to housing 74, for maintaining the rollers 80 in their relative, spaced positions, although each roller 80 is permitted limited movement. Retaining member 82 further includes a plurality of springs 84, disposed adjacent one side of each roller 80. Retaining member 82 is preferably molded of a plastic material, so that springs 84 may be leaf springs molded as integral portions of retaining member 82. The interior surface of clutch housing 74 includes a plurality of indentations, one each for each roller 80, with each indentation including a ramp surface 86.

It will be noted in FIGS. 3 and 4 that arrows designated 64a, 70a, and 72a correspond to rotations depicted in FIG. 2 by arrows 64, 70, and 72, respectively.

Referring to FIG. 3, when input shaft 44 is rotated as indicated by arrow 64a, the relative rotation between shaft 44 and gear 52 causes the rollers 80 to be moved against springs 84 and thus away from ramp surfaces 86.

Springs 84, however, further serve to prevent rollers 80 from contacting the surfaces of housing 74 opposite ramp surfaces 86, and thus rollers 80 are free to rotate. This in turn permits shaft 44 and gear 52 to be rotated independently of each other, with gear 52 being rotated (by gear 54) as indicated by arrow 70a.

In FIG. 4, the direction of rotation of shaft 44 is reversed, shown by arrow 72a. In this case, the relative rotation between shaft 44 and clutch 62 is such that rollers 80, assisted by the urging of springs 84, are drawn into contact with ramp surfaces 86. Thus, rollers 80 become wedged between shaft 44 and clutch housing 74, transmitting torque between shaft 44 and gear 52. Thus, gear 52 is rotated by shaft 44 as shown by arrow 70a.

It will be easily seen that bearing clutch 60, identical in construction to clutch 62, operates in a manner similar to clutch 62, and thus need not be described in detail.

Clutches 60 and 62 are further operative to prevent rotation of drive shaft 28 in a direction opposite to that indicated by arrow 68, such as would be the case if rotor 30 were to motor within stator 32. Referring again to FIG. 4, it can be seen that in the event gear 52 were to be driven in a direction opposite that shown by arrow 70a, as would be the case if shaft 28 were to be rotated opposite its normal direction, the movement of bearing housing 74 would be such that rollers 80 would be wedged into their locked position between ramp surfaces 86 and shaft 44. It will be further recognized that similar rotation of gear 50 in the direction opposite its normal rotation would cause clutch 60 to also become engaged. Since each clutch 60 and 62 would be engaged for rotating shaft 44 in opposite directions simultaneously, the entire gear box 40 would be locked against rotation in any direction. Thus, drive shaft 28 would be prevented from rotating in the backwards direction.

In addition to rotation of shaft 44 by handles 46 and 48, other means of driving the pump 10 may be provided. An electric motor (not shown) may be used for rotation of input shaft 44. In such a case, a drive linkage means such as a belt and pulley arrangement can be used to connect the motor and shaft 44. It will be readily recognized that gear box 40 makes the direction of operation of the motor immaterial.

Figure 5:
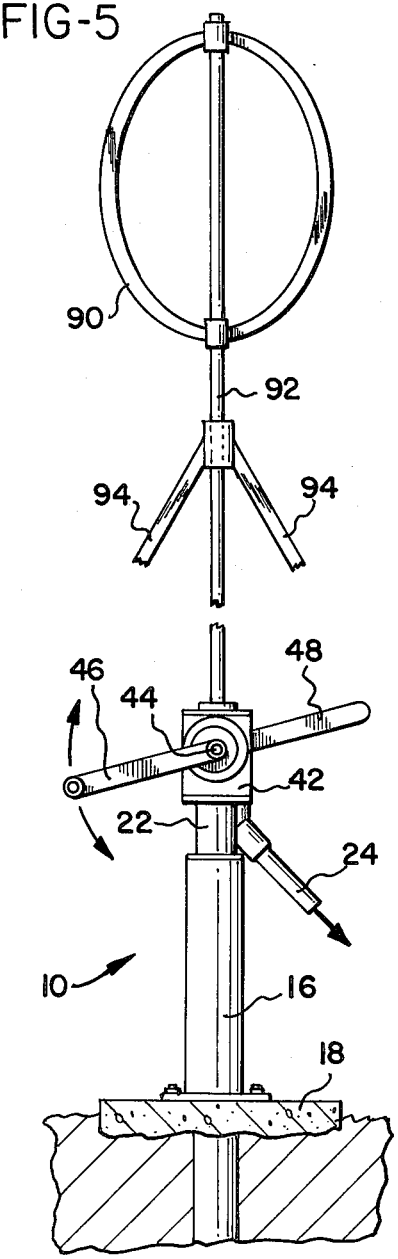
FIG. 5 is an elevational view of an embodiment of the water pump adapted for wind operation.

As a third alternative, the pump 10 may be powered by a wind-driven turbine. As seen in FIG. 5, the turbine 90 is mounted to a drive shaft 92 extending upwardly from the gear box housing 42 of water pump 10, and is stabilized by support braces 94.

As shown in FIG. 6, a modified gear box 140 is used with wind turbine 90 for driving the drive shaft 28 of pump 10. Gear box 140 includes a pair of bevel gears 150 and 152, mounted to input shaft 44 along with cooperating bearing clutches 160 and 162, respectively. Both gears engage a third bevel gear 154 mounted to the upper end of drive shaft 28 by nut 156. It will be understood that this portion of gear box 140 is identical in construction and operation to gear box 40 shown in FIG. 2.

A fourth bevel gear 190 is provided in gear box 140, mounted with cooperating bearing clutch 192 to the lower end of shaft 92. Gear 190 is positioned so as to be directly opposite gear 154 across input shaft 44. Clutch 192 is oriented such that rotation of shaft 92 as shown by arrow 194 causes clutch 192 to engage, whereby gear 190 is driven by rotation of shaft 92. This in turn rotates gears 150 and 152 as shown by arrows 166 and 170, respectively. Drive shaft 28 is then driven as shown by arrow 168.

Since clutch 192 is similar in construction and operation to clutches 60 and 62, it can be seen that rotation of shaft 92 by wind turbine 90 in the direction opposite arrow 194 causes clutch 192 to disengage, whereupon shaft 92 rotates freely within gear 190. Thus, there is no danger of turbine 90 inadvertently driving the water pump 10 in the wrong direction. Moreover, as can be seen by comparing FIGS. 3 and 4, driving of gears 150 and 152 from shaft 92 and gear 190, rather than from input shaft 44, causes clutches 160 and 162 to disengage. Thus, when the pump 10 is being driven by wind turbine 90, input shaft 44, as well as handles 46 and 48, remain stationary. Similarly, it can also be seen that by driving gear 190 from gears 150 and 152 and input shaft 44, rather than by shaft 92, causes clutch 192 to disengage. Accordingly, when the pump 10 is driven by rotation of the handles, the wind turbine 90 will remain stationary.

Thus, the pump 10 installed with wind turbine 90 is capable of being operated in a variety of wind conditions. When there is no wind, the pump 10 may be operated manually by rotating handles 46 and 48. During periods of low wind, the handles may be used to start the pump 10. The wind turbine 90, once permitted to start by having the load from pump 10 removed, can sustain the pumping. During high winds, of course, the wind turbine can both start pump 10 as well as sustain pumping.

An additional alternate embodiment of the water pump 10 utilizes the gear box 240 shown in FIG. 7 or obtaining two different rates of pumping for a single rotational speed of input shaft 44. A pair of bevel gears 250 and 252 are mounted, along with corresponding bearing clutches 260 and 262, respectively, to input shaft 44. It should be noted that in this embodiment, however, gears 250 and 252 are not identical diameters. A pair of bevel gears 254a and 254b are mounted to the drive shaft 28 and secured by nut 256. The gears are mounted such that gears 250 and 254a engage, gears 252 and 254b engage, with each pair of engaged gears defining a different gear ratio. Thus, rotation of input shaft 44 as shown by arrow 264 engages clutch 260, rotates gear 250 as indicated by arrow 266, and drives drive shaft 28 through gears 250 and 254a. Gears 254b and 252 are rotated, but since rotation of gear 252 in the direction of arrow 270 causes clutch 262 to disengage, gear 252 rotates freely about input shaft 44. Similarly, rotation of input shaft 44 as shown by arrow 272 causes drive shaft 28 to be driven through gears 252 and 254b. Due to the differing gear ratios between the engaged gear pairs, however, rotation of input shaft 44 in one direction causes drive shaft 28 to be rotated at a higher speed, whereby water is delivered by the pump 10 at a higher flow rate but with a higher power input requirement than when rotated in the opposite direction.

Depending upon the particular installation of pump 10, gear box 240 could be used to permit an individual person to turn the pump handles in one direction with a manageable power requirement and still obtain an acceptable amount of water. Two persons, however, one on each handle, could rotate the handles in the opposite direction, producing a higher flow rate. Or, the installation may be such that a child standing on a step on one side of the pump 10 could turn the handles in one direction, while an adult standing on the opposite side of pump 10 turning the handles in the opposite direction can receive a greater amount of water. Moreover, a single-speed, reversible motor (not shown) can be used to drive pump 10, connected to input shaft 44 by an appropriate belt and pulley arrangement or the like, to obtain two different pumping rates depending upon the direction of energization of the motor.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A water pump comprising a pump stand, a spout mounted on said pump stand for communication with the interior of said pump, a pipe communicating with the interior of said pump stand and extending downwardly toward an underground water supply, a rotary drive shaft supported by said pump stand and extending downwardly within said pipe, stator means supported by said pipe and communicating with said water supply, a pump rotor supported by said drive shaft and positioned within said stator means for cooperating therewith to pump water up said pipe to said pump stand and said spout, a gear box supported on said pump stand for applying a rotary driving motion to said drive shaft, an input shaft for applying a rotary driving motion to said gear box, and a means for rotation of said input shaft, said water pump characterized in that said gear box comprises:

first and second bevel gears mounted on said input shaft and spaced apart relation;

first clutch means for permitting relative rotary motion in a first direction between said input shaft and said first bevel gear while prohibiting relative rotary motion in a second direction opposite said first direction;

second clutch means for permitting relatively rotary motion between said input shaft and said second bevel gear in said second direction while prohibiting relative rotary motion therebetween in said first direction; and a third bevel gear mounted fast on said drive shaft for driving contact with said first and second bevel gears whereby said drive shaft is rotated in a common direction by rotation of said input shaft in either of said first or second directions and is locked against rotation due to rotary forces upon said drive shaft in a direction opposite said common direction.

2. A water pump as defined in claim 1, wherein said means for rotation of said input shaft includes a handle mounted fast on said input shaft.

3. A water pump as defined in claim 1, wherein said means for rotation of said input shaft includes a motor operatively connected with said input shaft such that energization of said motor causes rotation of said input shaft.

4. A water pump as defined in claim 1, further comprising:

a wind-driven turbine;

a rotatable turbine shaft, said shaft being driven by rotation of said turbine;

a fourth bevel gear mounted on said turbine shaft for driving contact with said first and second bevel gears; and clutch means for permitting relative rotary motion in a first direction between said turbine shaft and said fourth bevel gear such that driving of said fourth bevel gear by said turbine shaft causes said drive shaft to be rotated in said common direction through said first, second and third bevel gears, and for prohibiting relative rotary motion between said fourth bevel gear and said turbine shaft in a second direction opposite said first direction.

5. A water pump comprising a pump stand, a spout mounted on said pump stand for communication with the interior of said pump, a pipe communicating with the interior of said pump stand and extending downwardly toward an underground water supply, a rotary drive shaft supported by said pump stand and extending downwardly within said pipe, stator means supported by said pipe and communcating with said water supply, a pump rotor supported by said drive shaft and positioned within said stator means for cooperating therewith to pump water up said pipe to said pump stand and said spout, a gear box supported on said pump stand for applying a rotary driving motion to said drive shaft, an input shaft for applying a rotary driving motion to said gear box, and a means for rotation of said input shaft, said water pump characterized in that said gear box comprises:

first and second bevel gears mounted on said input shaft in spaced apart relation, said gears being of different diameters;

first clutch means for permitting relative rotary motion in a first direction between said input shaft and said first bevel gear while prohibiting relative rotary motion in a second a direction opposite said first direction;

second clutch means for permitting relative rotary motion between said input shaft and said second bevel gear in said second direction while prohibiting relative rotary motion therebetween in said first direction;

a third bevel gear mounted fast on said drive shaft for driving contact with said first bevel gear; and a fourth bevel gear mounted fast on said drive shaft for driving contact with said second bevel gear;

said drive shaft being rotated in a common direction by rotation of said input shaft in either of said first or second directions and locked against rotation due to rotary forces upon said drive shaft in a direction opposite said common direction.

6. A water pump as defined in claim 5, wherein said means for rotation of said input shaft includes a handle mounted fast on said input shaft.

7. A water pump as defined in claim 5, wherein said means for rotation of said input shaft includes a selectively reversible motor operatively connected with said input shaft such that energization of said motor causes rotation of said input shaft.

* * * * *